(12) United States Patent
Hasegawa

(10) Patent No.: US 12,703,207 B2
(45) Date of Patent: Aug. 11, 2026

(54) TIRE

(71) Applicant: THE YOKOHAMA RUBBER CO., LTD., Kanagawa (JP)

(72) Inventor: Mayuko Hasegawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/863,527

(22) PCT Filed: Apr. 28, 2023

(86) PCT No.: PCT/JP2023/016933
§ 371 (c)(1),
(2) Date: Nov. 6, 2024

(87) PCT Pub. No.: WO2023/219018
PCT Pub. Date: Nov. 16, 2023

(65) Prior Publication Data

US 2025/0303801 A1 Oct. 2, 2025

(30) Foreign Application Priority Data

May 11, 2022 (JP) ................................ 2022-078167

(51) Int. Cl.
*B60C 13/00* (2006.01)
*B60C 3/04* (2006.01)
(Continued)

(52) U.S. Cl.
CPC .............. *B60C 13/003* (2013.01); *B60C 3/04* (2013.01); *B60C 9/28* (2013.01); *B60C 11/01* (2013.01); *B60C 2011/0033* (2013.01)

(58) Field of Classification Search
CPC ... B60C 11/01; B60C 3/04; B60C 2011/0353; B60C 11/0041
See application file for complete search history.

(56) References Cited

U.S. PATENT DOCUMENTS 6,073,668 A 6/2000 Iwasaki et al.
2007/0131330 A1 * 6/2007 Yamashita .......... B60C 17/0009 152/517
(Continued)

FOREIGN PATENT DOCUMENTS

DE 698 31 110 T2 5/2006
JP 8-337101 A 12/1996
(Continued)

*Primary Examiner* — Justin R Fischer
*Assistant Examiner* — Nicholas J Weiler
(74) *Attorney, Agent, or Firm* — Thorpe North & Western

(57) ABSTRACT

A tire has, in a cross-sectional view in a tire meridian direction when the tire is mounted on a specified rim, inflated to 230 kPa, and in an unloaded state, a radial distance D3 from a point P1 to a point T3 with respect to a radial distance D1 from the point P1 to a point T1 in a range 0.05≤D3/D1≤0.15. The tire has a radial distance D6 from the point P1 to a point T6 with respect to the radial distance D3 from the point P1 to the point T3 in a range 3.00≤D6/D3≤6.00. The tire has a radius of curvature R1 of a first arc passing through the point T3 and points T4 and T5 with respect to a radius of curvature R2 of a second arc passing through the points T1 and T6 and a point T7 in a range 0.40≤R1/R2≤1.00.

12 Claims, 9 Drawing Sheets

(51) Int. Cl.

| | |
|---|---|
| ***B60C 9/28*** | (2006.01) |
| ***B60C 11/01*** | (2006.01) |
| ***B60C 11/03*** | (2006.01) |
| *B60C 11/00* | (2006.01) |

(56) References Cited

U.S. PATENT DOCUMENTS

| | | | | |
|---|---|---|---|---|
| 2016/0052342 | A1* | 2/2016 | Ueda | B60C 3/04 152/454 |
| 2017/0028782 | A1* | 2/2017 | Miyake | B60C 9/20 |
| 2017/0072857 | A1 | 3/2017 | Kowatari et al. | |
| 2020/0223261 | A1* | 7/2020 | Ueyama | B60C 11/0302 |

FOREIGN PATENT DOCUMENTS

| | | | |
|---|---|---|---|
| JP | 9-254607 | A | 9/1997 |
| JP | 11-1103 | A | 1/1999 |
| JP | 2015-113008 | A | 6/2015 |
| JP | 2021-187371 | A | 12/2021 |
| JP | 2022012888 | A | 1/2022 |

* cited by examiner

| | Comparative Example | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| D3/D1 | 0.03 | 0.06 | 0.11 | 0.15 | 0.11 | 0.11 | 0.11 | 0.11 | 0.11 | 0.11 | 0.11 | 0.11 | 0.11 |
| D6/D3 | 17.0 | 6.00 | 6.00 | 6.00 | 5.00 | 4.00 | 3.00 | 4.00 | 4.00 | 4.00 | 4.00 | 4.00 | 4.00 |
| R1 (mm) | 10.0 | 10.0 | 10.0 | 10.0 | 10.0 | 10.0 | 10.0 | 20.0 | 34.0 | 48.0 | 34.0 | 34.0 | 34.0 |
| R1/R2 | 1.30 | 1.00 | 1.00 | 1.00 | 1.00 | 1.00 | 1.00 | 1.00 | 1.00 | 1.00 | 0.75 | 0.48 | 0.40 |
| D5/D1 | 0.47 | 0.47 | 0.47 | 0.47 | 0.47 | 0.47 | 0.47 | 0.47 | 0.47 | 0.47 | 0.47 | 0.47 | 0.47 |
| Da/Db | 0.18 | 0.18 | 0.18 | 0.18 | 0.18 | 0.18 | 0.18 | 0.18 | 0.18 | 0.18 | 0.18 | 0.18 | 0.18 |
| Ac/At | 0.20 | 0.20 | 0.20 | 0.20 | 0.20 | 0.20 | 0.20 | 0.20 | 0.20 | 0.20 | 0.20 | 0.20 | 0.20 |
| Ac/As | 0.70 | 0.70 | 0.70 | 0.70 | 0.70 | 0.70 | 0.70 | 0.70 | 0.70 | 0.70 | 0.70 | 0.70 | 0.70 |
| Ds/DW | 0.25 | 0.25 | 0.25 | 0.25 | 0.25 | 0.25 | 0.25 | 0.25 | 0.25 | 0.25 | 0.25 | 0.25 | 0.25 |
| Wb1/DW | 0.55 | 0.55 | 0.55 | 0.55 | 0.55 | 0.55 | 0.55 | 0.55 | 0.55 | 0.55 | 0.55 | 0.55 | 0.55 |
| Ga3/Ga1 | 0.65 | 0.65 | 0.65 | 0.65 | 0.65 | 0.65 | 0.65 | 0.65 | 0.65 | 0.65 | 0.65 | 0.65 | 0.65 |
| Gb3/Gb1 | 0.78 | 0.78 | 0.78 | 0.78 | 0.78 | 0.78 | 0.78 | 0.78 | 0.78 | 0.78 | 0.78 | 0.78 | 0.78 |
| Gb4/Gb3 | 0.65 | 0.65 | 0.65 | 0.65 | 0.65 | 0.65 | 0.65 | 0.65 | 0.65 | 0.65 | 0.65 | 0.65 | 0.65 |
| Low rolling resistance performance | 100 | 113 | 114 | 115 | 115 | 116 | 117 | 115 | 115 | 115 | 115 | 115 | 115 |
| Wet performance | 100 | 106 | 105 | 104 | 104 | 103 | 102 | 102 | 101 | 100 | 102 | 103 | 104 |

FIG. 7

| | Example 13 | Example 14 | Example 15 | Example 16 | Example 17 | Example 18 | Example 19 | Example 20 | Example 21 | Example 22 | Example 23 | Example 24 |
|---|---|---|---|---|---|---|---|---|---|---|---|---|
| D3/D1 | 0.11 | 0.11 | 0.11 | 0.11 | 0.11 | 0.11 | 0.11 | 0.11 | 0.11 | 0.11 | 0.11 | 0.11 |
| D6/D3 | 4.00 | 4.00 | 4.00 | 4.00 | 4.00 | 4.00 | 4.00 | 4.00 | 4.00 | 4.00 | 4.00 | 4.00 |
| R1 (mm) | 34.0 | 34.0 | 34.0 | 34.0 | 34.0 | 34.0 | 34.0 | 34.0 | 34.0 | 34.0 | 34.0 | 34.0 |
| R1/R2 | 0.48 | 0.48 | 0.48 | 0.48 | 0.48 | 0.48 | 0.48 | 0.48 | 0.48 | 0.48 | 0.48 | 0.48 |
| D5/D1 | 0.40 | 0.31 | 0.20 | 0.31 | 0.31 | 0.31 | 0.31 | 0.31 | 0.31 | 0.31 | 0.31 | 0.31 |
| Da/Db | 0.18 | 0.18 | 0.18 | 0.20 | 0.60 | 1.20 | 0.60 | 0.60 | 0.60 | 0.60 | 0.60 | 0.60 |
| Ac/At | 0.20 | 0.20 | 0.20 | 0.20 | 0.20 | 0.20 | 0.30 | 0.60 | 0.90 | 0.60 | 0.60 | 0.60 |
| Ac/As | 0.70 | 0.70 | 0.70 | 0.70 | 0.70 | 0.70 | 0.70 | 0.70 | 0.70 | 1.05 | 1.20 | 1.75 |
| Ds/DW | 0.25 | 0.25 | 0.25 | 0.25 | 0.25 | 0.25 | 0.25 | 0.25 | 0.25 | 0.25 | 0.25 | 0.25 |
| Wb1/DW | 0.55 | 0.55 | 0.55 | 0.55 | 0.55 | 0.55 | 0.55 | 0.55 | 0.55 | 0.55 | 0.55 | 0.55 |
| Ga3/Ga1 | 0.65 | 0.65 | 0.65 | 0.65 | 0.65 | 0.65 | 0.65 | 0.65 | 0.65 | 0.65 | 0.65 | 0.65 |
| Gb3/Gb1 | 0.78 | 0.78 | 0.78 | 0.78 | 0.78 | 0.78 | 0.78 | 0.78 | 0.78 | 0.78 | 0.78 | 0.78 |
| Gb4/Gb3 | 0.65 | 0.65 | 0.65 | 0.65 | 0.65 | 0.65 | 0.65 | 0.65 | 0.65 | 0.65 | 0.65 | 0.65 |
| Low rolling resistance performance | 114 | 113 | 112 | 114 | 115 | 116 | 115 | 115 | 115 | 115 | 115 | 115 |
| Wet performance | 104 | 105 | 106 | 104 | 103 | 102 | 104 | 105 | 106 | 106 | 107 | 108 |

FIG. 8

| | Example 25 | Example 26 | Example 27 | Example 28 | Example 29 | Example 30 | Example 31 | Example 32 | Example 33 | Example 34 | Example 35 | Example 36 |
|---|---|---|---|---|---|---|---|---|---|---|---|---|
| D3/D1 | 0.11 | 0.11 | 0.11 | 0.11 | 0.11 | 0.11 | 0.11 | 0.11 | 0.11 | 0.11 | 0.11 | 0.11 |
| D6/D3 | 4.00 | 4.00 | 4.00 | 4.00 | 4.00 | 4.00 | 4.00 | 4.00 | 4.00 | 4.00 | 4.00 | 4.00 |
| R1 (mm) | 34.0 | 34.0 | 34.0 | 34.0 | 34.0 | 34.0 | 34.0 | 34.0 | 34.0 | 34.0 | 34.0 | 34.0 |
| R1/R2 | 0.48 | 0.48 | 0.48 | 0.48 | 0.48 | 0.48 | 0.48 | 0.48 | 0.48 | 0.48 | 0.48 | 0.48 |
| D5/D1 | 0.31 | 0.31 | 0.31 | 0.31 | 0.31 | 0.31 | 0.31 | 0.31 | 0.31 | 0.31 | 0.31 | 0.31 |
| Da/Db | 0.60 | 0.60 | 0.60 | 0.60 | 0.60 | 0.60 | 0.60 | 0.60 | 0.60 | 0.60 | 0.60 | 0.60 |
| Ac/At | 0.60 | 0.60 | 0.60 | 0.60 | 0.60 | 0.60 | 0.60 | 0.60 | 0.60 | 0.60 | 0.60 | 0.60 |
| Ac/As | 1.20 | 1.20 | 1.20 | 1.20 | 1.20 | 1.20 | 1.20 | 1.20 | 1.20 | 1.20 | 1.20 | 1.20 |
| Ds/DW | 0.20 | 0.18 | 0.05 | 0.18 | 0.18 | 0.18 | 0.18 | 0.18 | 0.18 | 0.18 | 0.18 | 0.18 |
| Wb1/DW | 0.55 | 0.55 | 0.55 | 0.65 | 0.80 | 0.90 | 0.80 | 0.80 | 0.80 | 0.80 | 0.80 | 0.80 |
| Ga3/Ga1 | 0.65 | 0.65 | 0.65 | 0.65 | 0.65 | 0.65 | 0.70 | 0.92 | 0.98 | 0.92 | 0.92 | 0.92 |
| Gb3/Gb1 | 0.78 | 0.78 | 0.78 | 0.78 | 0.78 | 0.78 | 0.80 | 1.01 | 1.10 | 1.01 | 1.01 | 1.01 |
| Gb4/Gb3 | 0.65 | 0.65 | 0.65 | 0.65 | 0.65 | 0.65 | 0.65 | 0.65 | 0.65 | 0.70 | 0.84 | 1.10 |
| Low rolling resistance performance | 115 | 115 | 115 | 114 | 113 | 112 | 112 | 111 | 110 | 110 | 109 | 108 |
| Wet performance | 108 | 109 | 110 | 110 | 111 | 112 | 112 | 113 | 114 | 113 | 113 | 113 |

FIG. 9

TIRE

TECHNICAL FIELD

The technology relates to a tire and particularly relates to a tire that can provide low rolling resistance performance and wet performance in a compatible manner.

BACKGROUND ART

To reduce tire rolling resistance, recent tires adopt a structure in which a profile from a tread portion to a tire side portion is optimized. As a known tire adopting such a structure, a technology described in Japan Unexamined Patent Publication No. 2015-113008 A is known.

To reduce tire rolling resistance, use of a tire at internal pressure higher than specified internal pressure has recently been intended. It is necessary to appropriately ensure a contact patch shape of a tire and ensure wet performance of the tire even under a use condition at such a high internal pressure.

SUMMARY

The present technology provides a tire that can provide low rolling resistance performance and wet performance in a compatible manner under the use condition at high internal pressure.

A tire according to an embodiment of the present technology is a tire including: a carcass layer; a belt layer formed by layering a pair of cross belts; and a tread rubber and sidewall rubbers. In a cross-sectional view in a tire meridian direction when the tire is mounted on a specified rim, inflated to 230 kPa, and in an unloaded state, a maximum diameter position of a tire profile is defined as a point P1, a maximum width position of the tire profile is defined as a point T1, an intersection point between a straight line that passes through the point T1 and is parallel to a tire width direction and a tire equatorial plane is defined as a point T2, a position of 30% of a distance from the point T1 to the point T2 is defined as a point T3, a position of 20% of the distance from the point T1 to the point T2 is defined as a point T4, a position of 15% of the distance from the point T1 to the point T2 is defined as a point T5, a position of 10% of the distance from the point T1 to the point T2 is defined as a point T6, a position of 3% of the distance from the point T1 to the point T2 is defined as a point T7, a radial distance D3 from the point P1 to the point T3 with respect to a radial distance D1 from the point P1 to the point T1 is in a range $0.05 \leq D3/D1 \leq 0.15$, a radial distance D6 from the point P1 to the point T6 with respect to the radial distance D3 from the point P1 to the point T3 is in a range $3.00 \leq D6/D3 \leq 6.00$, and a radius of curvature R1 of a first arc passing through the points T3, T4, and T5 with respect to a radius of curvature R2 of a second arc passing through the points T1, T6, and T7 is in a range $0.40 \leq R1/R2 \leq 1.00$.

The tire according to an embodiment of the present technology properly sets the ratio D3/D1, the ratio D6/D3, and the ratio R1/R2 under the use condition at high internal pressure, thus having an advantage of providing low rolling resistance performance and wet performance in a compatible manner. Specifically, (1) the lower limit described above of the ratio D3/D1 suppresses a decrease in the tire rolling resistance due to an excessive ground contact pressure of the tread portion shoulder region. The upper limit described above of the ratio D3/D1 ensures a ground contact length of the tread portion shoulder region, ensuring the wet performance of the tire. (2) The lower limit described above of the ratio D6/D3 suppresses a decrease in tire ground contact area due to an excessive increase in the radial distance D3 from the point P1 to the point T3, ensuring the wet performance of the tire. The upper limit described above of the ratio D6/D3 suppresses a deterioration in the tire rolling resistance due to an excessive rubber volume of the buttress portion. (3) The lower limit described above of the ratio R1/R2 ensures uniformity of the ground contact pressure distribution on the tire ground contact surface, and energy loss during rolling of the tire is reduced. Accordingly, the tire rolling resistance is reduced. The upper limit described above of the ratio R1/R2 ensures the tensile force of the carcass layer 13, ensuring the rigidity of the tire. This appropriately ensures the contact patch shape of the tire, ensuring the wet performance of the tire.

BRIEF DESCRIPTION OF DRAWINGS

FIG. 7 is a table showing results of performance tests of tires according to embodiments of the technology.

FIG. 8 is a table showing results of performance tests of tires according to embodiments of the technology.

FIG. 9 is a table showing results of performance tests of tires according to embodiments of the technology.

DETAILED DESCRIPTION

Embodiments of the technology will be described in detail below with reference to the drawings. Note that the technology is not limited to the embodiments. Constituents of the embodiments include constituents that are substitutable and are obviously substitutes while maintaining consistency with the embodiments of the technology. A plurality of modified examples described in the embodiments can be combined in a discretionary manner within the scope apparent to one skilled in the art.

Tire

Figure 1:
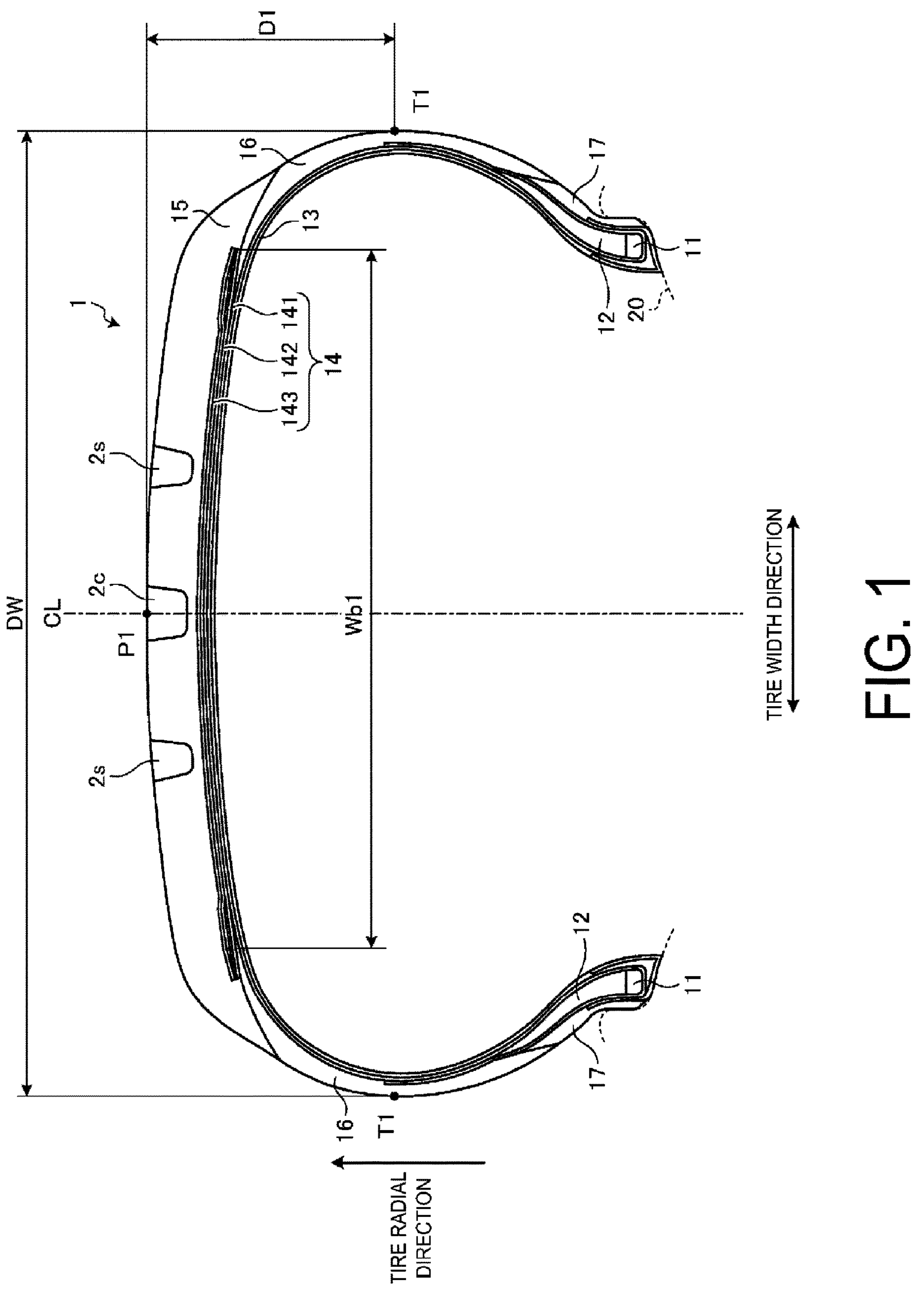
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region in a tire radial direction. In this embodiment, a pneumatic radial tire for use on passenger cars will be described as an example of the tire.

In the same drawing, a cross-section in the tire meridian direction is defined as a cross-section of the tire taken along a plane that includes a tire rotation axis (not illustrated). A tire equatorial plane CL is defined as a plane that passes through a midpoint of a tire cross-sectional width specified by the Japan Automobile Tyre Manufacturers Association Inc. (JATMA) and that is perpendicular to the tire rotation axis. A tire width direction is defined as a direction parallel to the tire rotation axis, and the tire radial direction is defined as a direction perpendicular to the tire rotation axis.

The tire 1 has an annular structure centered on the tire rotation axis, and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 respectively include one or a plurality of bead wires made of steel and wound in an annular shape a plurality of times, are embedded in bead portions, and constitute cores of the left and right bead portions. The pair of bead fillers 12, 12 are respectively disposed on an outer circumference of the pair of bead cores 11, 11 in the tire radial direction and reinforce the bead portions.

The carcass layer 13 has a single layer structure including one carcass ply or a multilayer structure including a plurality of carcass plies layered, extends in a toroidal shape between the left and right bead cores 11, 11, and constitutes the backbone of the tire. Both end portions of the carcass layer 13 are turned back toward outer sides in the tire width direction and fixed to wrap the bead cores 11 and the bead fillers 12. The carcass ply of the carcass layer 13 is made by covering a plurality of carcass cords made of steel or an organic fiber material (for example, aramid, nylon, polyester, or rayon) with a coating rubber and performing a rolling process on the carcass cords, and has a cord angle (defined as an inclination angle of the carcass cords in a longitudinal direction with respect to a tire circumferential direction) of 80 degrees or more and 100 degrees or less.

The belt layer 14 is formed by layering a plurality of belt plies 141 to 143 and disposed around the outer circumference of the carcass layer 13. The belt plies 141 to 143 include a pair of cross belts 141, 142 and a belt cover 143.

The pair of cross belts 141, 142 are made by covering a plurality of belt cords made of steel or an organic fiber material with a coating rubber and performing a rolling process on the belt cords, and have a cord angle (defined as an inclination angle of the belt cords in a longitudinal direction with respect to the tire circumferential direction) of 15 degrees or more and 55 degrees or less as an absolute value. The pair of cross belts 141, 142 have cord angles having mutually opposite reference signs and are layered by making the belt cords intersect with each other in the longitudinal direction of the belt cords (a so-called crossply structure). The pair of cross belts 141, 142 are disposed in a layered manner on an outer side of the carcass layer 13 in the tire radial direction. Here, the cross belt 141 located on the inner side in the tire radial direction is defined as a radially inner cross belt, and the cross belt 142 located on the outer side in the tire radial direction is defined as a radially outer cross belt.

The belt cover 143 is made by covering belt cover cords made of steel or an organic fiber material with a coating rubber and has a cord angle of 0 degrees or more and 10 degrees or less as an absolute value. The belt cover 143 is, for example, a strip material formed by covering one or a plurality of belt cover cords with a coating rubber, and the strip material is wound on the outer circumferential surfaces of the cross belts 141, 142 a plurality of times in a spiral-like manner in the tire circumferential direction. The belt cover 143 is disposed to cover the entirety of the cross belts 141, 142.

The tread rubber 15 is disposed on an outer circumference of the carcass layer 13 and the belt layer 14 in the tire radial direction and constitutes a tread portion of the tire 1. The pair of sidewall rubbers 16, 16 are respectively disposed on an outer side of the carcass layer 13 in the tire width direction to constitute left and right sidewall portions. The pair of rim cushion rubbers 17, 17 extend from an inner side in the tire radial direction of the left and right bead cores 11, 11 and turned back portions of the carcass layer 13 toward the outer side in the tire width direction, to constitute rim fitting surfaces of the bead portions.

Tire Profile

Figure 2:
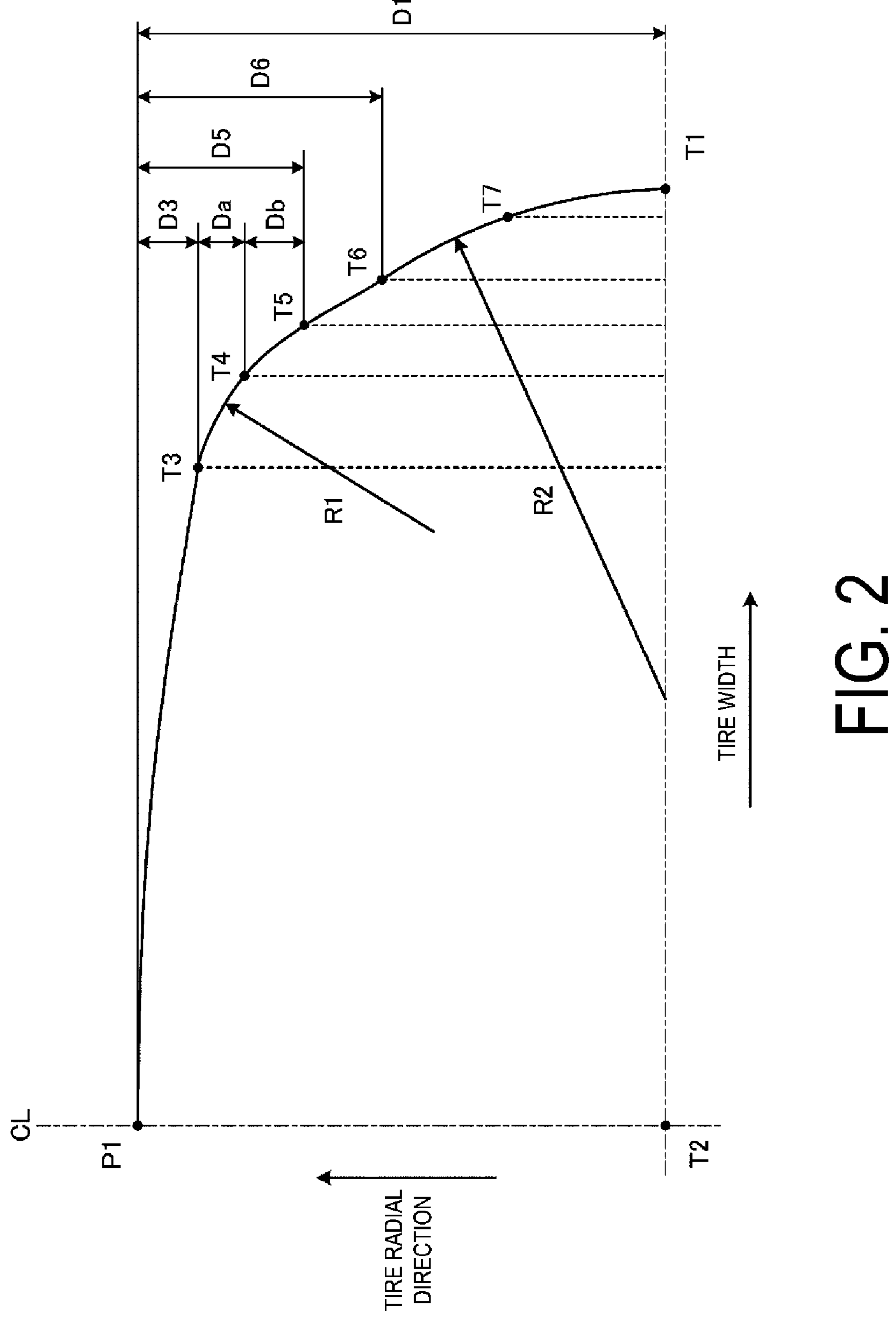
FIG. 2 is an explanatory diagram illustrating a profile of the tire illustrated in FIG. 1.

FIG. 2 is an explanatory diagram illustrating a profile of the tire 1 illustrated in FIG. 1. The same drawing illustrates the profile from the tire equatorial plane CL to a tire maximum width position T1. Here, since the tire profile has a left-right symmetric structure with respect to the tire equatorial plane CL, a half region demarcated by the tire equatorial plane CL will be described in detail.

In FIGS. 1 and 2, a maximum diameter position of the tire profile is defined as a point P1 in the cross-sectional view in the tire meridian direction when the tire is mounted on a specified rim, inflated to 230 kPa, and in an unloaded state. A maximum width position of the tire profile is defined as a point T1.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). "Specified internal pressure" described below refers to a "maximum air pressure" specified by JATMA, the maximum value in "TIRE LOAD LIMITS AT VARIOUS COLD INFLATION PRESSURES" specified by TRA, or "INFLATION PRESSURES" specified by ETRTO. A specified load refers to a "maximum load capacity" specified by JATMA, the maximum value in "TIRE LOAD LIMITS AT VARIOUS COLD INFLATION PRESSURES" specified by TRA, or "LOAD CAPACITY" specified by ETRTO. However, in JATMA, in the case of a tire for a passenger vehicle, the specified internal pressure is an air pressure of 180 kPa, and the specified load is 88% of the maximum load capacity at the specified internal pressure.

The point P1 at the maximum diameter position of the tire profile is defined as an intersection point between the tire profile and the tire equatorial plane CL in the cross-sectional view in the tire meridian direction.

The point T1 at the maximum width position of the tire profile is defined as an end point of a tire cross-sectional width DW. A radial distance D1 from the point P1 to the point T1 with respect to a tire outer diameter OD (not illustrated) is in the range $0.15 \le D1/(OD/2) \le 0.20$.

The tire cross-sectional width DW is measured as a linear distance between sidewalls excluding patterns, letters, and the like on the tire side surface when the tire is mounted on a specified rim, inflated to 230 kPa, and in an unloaded state.

An intersection point between a straight line passing through the point T1 and parallel to the tire width direction and the tire equatorial plane CL is defined as a point T2. A position of 30% of a distance from the point T1 to the point T2 is defined as a point T3. A position of 20% of the distance from the point T1 to the point T2 is defined as a point T4. A position of 15% of the distance from the point T1 to the point T2 is defined as a point T5. A position of 10% of the distance from the point T1 to the point T2 is defined as a point T6. A position of 3% of the distance from the point T1 to the point T2 is defined as a point T7.

In this case, a radial distance D3 from the point P1 to the point T3 with respect to the radial distance D1 from the point P1 to the point T1 is in the range $0.05 \le D3/D1 \le 0.15$ and preferably in the range $0.10 \le D3/D1 \le 0.13$.

A radial distance D6 from the point P1 to the point T6 with respect to the radial distance D3 from the point P1 to the point T3 is in the range $3.00 \leq D6/D3 \leq 6.00$, preferably in the range $3.20 \leq D6/D3 \leq 5.00$, and more preferably in the range $3.50 \leq D6/D3 \leq 4.50$.

A radius of curvature R1 of a first arc passing through the points T3, T4, and T5 with respect to a radius of curvature R2 of a second arc passing through the points T1, T6, and T7 is in the range $0.40 \leq R1/R2 \leq 1.00$, preferably in the range $0.45 \leq R1/R2 \leq 0.85$, and more preferably in the range $0.50 \leq R1/R2 \leq 0.70$. The radius of curvature R1 is in the range 20 mm≤R1≤50 mm and more preferably in the range 22 mm≤R1≤35 mm.

In the configuration described above, since the ratio D3/D1, the ratio D6/D3, and the ratio R1/R2 under the use condition at high internal pressure are properly set, tire's low rolling resistance performance and wet performance are provided in a compatible manner. Specifically, (1) the lower limit described above of the ratio D3/D1 suppresses a decrease in the tire rolling resistance due to an excessive ground contact pressure of the tread portion shoulder region. The upper limit described above of the ratio D3/D1 ensures a ground contact length of the tread portion shoulder region, ensuring the wet performance of the tire. (2) The lower limit described above of the ratio D6/D3 suppresses a decrease in tire ground contact area due to an excessive increase in the radial distance D3 from the point P1 to the point T3, ensuring the wet performance of the tire. The upper limit described above of the ratio D6/D3 suppresses a deterioration in the tire rolling resistance due to an excessive rubber volume of the buttress portion. (3) The lower limit described above of the ratio R1/R2 ensures uniformity of the ground contact pressure distribution on the tire ground contact surface, and energy loss during rolling of the tire is reduced. Accordingly, the tire rolling resistance is reduced. The upper limit described above of the ratio R1/R2 ensures the tensile force of the carcass layer 13, ensuring the rigidity of the tire. This appropriately ensures the contact patch shape of the tire, ensuring the wet performance of the tire.

In FIG. 2, a radial distance D5 from the point P1 to the point T5 with respect to the radial distance D1 from the point P1 to the point T1 is in the range $0.20 \leq D5/D1 \leq 0.40$ and preferably in the range $0.30 \leq D5/D1 \leq 0.35$. Accordingly, the contact patch shape of the tire is appropriately ensured. Specifically, the lower limit described above suppresses a decrease in the tire rolling resistance due to an excessive ground contact pressure of the tread portion shoulder region. The upper limit described above suppresses a decrease in the tire ground contact area due to an excessive increase in the radius of curvature of the profile from the point T3 to the point T5, ensuring the wet performance of the tire.

A tire ground contact edge (reference numeral omitted in the drawing) when the tire is inflated to 230 kPa as above and to the specified internal pressure is located at a position of 25% to 35% and preferably 26% to 33% of the distance from the point T1 to the point T2. Additionally, the distance in the tire width direction from the tire ground contact edge to the point T3 (reference numeral omitted in the drawing) with respect to the aforementioned distance from the point T1 to the point T2 is preferably within the range of ±5%. Thus, the tire ground contact edge is preferably located substantially at the same position as the point T3. Also, the tire ground contact edge may be located on an inner side of the point T3 in the tire width direction, or may be located on an outer side of the point T3 in the tire width direction (not illustrated).

In order to obtain an appropriate profile at the aforementioned internal pressure of 230 kPa, the tire 1 has the following profile at the specified internal pressure.

First, a maximum diameter position of a tire profile is defined as a point P1' in a cross-sectional view in the tire meridian direction when the tire is mounted on a specified rim, inflated to the specified internal pressure, and in an unloaded state (not illustrated, see FIG. 2). A maximum width position of the tire profile is defined as a point T1'. An intersection point between a straight line passing through the point T1' and parallel to the tire width direction and the tire equatorial plane CL is defined as a point T2'. A position of 30% of a distance from the point T1' to the point T2' is defined as a point T3'. A position of 20% of the distance from the point T1' to the point T2' is defined as a point T4'. A position of 15% of the distance from the point T1' to the point T2' is defined as a point T5'. A position of 10% of the distance from the point T1' to the point T2' is defined as a point T6'. A position of 3% of the distance from the point T1' to the point T2' is defined as a point T7'.

In this case, a radial distance D3' from the point P1' to the point T3' with respect to a radial distance D1' from the point P1' to the point T1' is in the range $0.05 \leq D3'/D1' \leq 0.15$ and preferably in the range $0.08 \leq D3'/D1' \leq 0.13$ (not illustrated). A radial distance D6' from the point P1' to the point T6' with respect to the radial distance D3' from the point P1' to the point T3' is in the range $3.20 \leq D6'/D3' \leq 5.00$ and preferably in the range $3.20 \leq D6'/D3' \leq 4.50$. A radius of curvature R1' of a first arc passing through the points T3', T4', and T5' with respect to a radius of curvature R2' of a second arc passing through the points T1', T6', and T7' is in the range $0.20 \leq R1'/R2' \leq 0.80$, preferably in the range $0.25 \leq R1'/R2' \leq 0.75$, and more preferably in the range $0.28 \leq R1'/R2' \leq 0.58$ (not illustrated). Accordingly, the tire profile at the time of the aforementioned high internal pressure of 230 kPa is appropriately secured.

Figure 3:
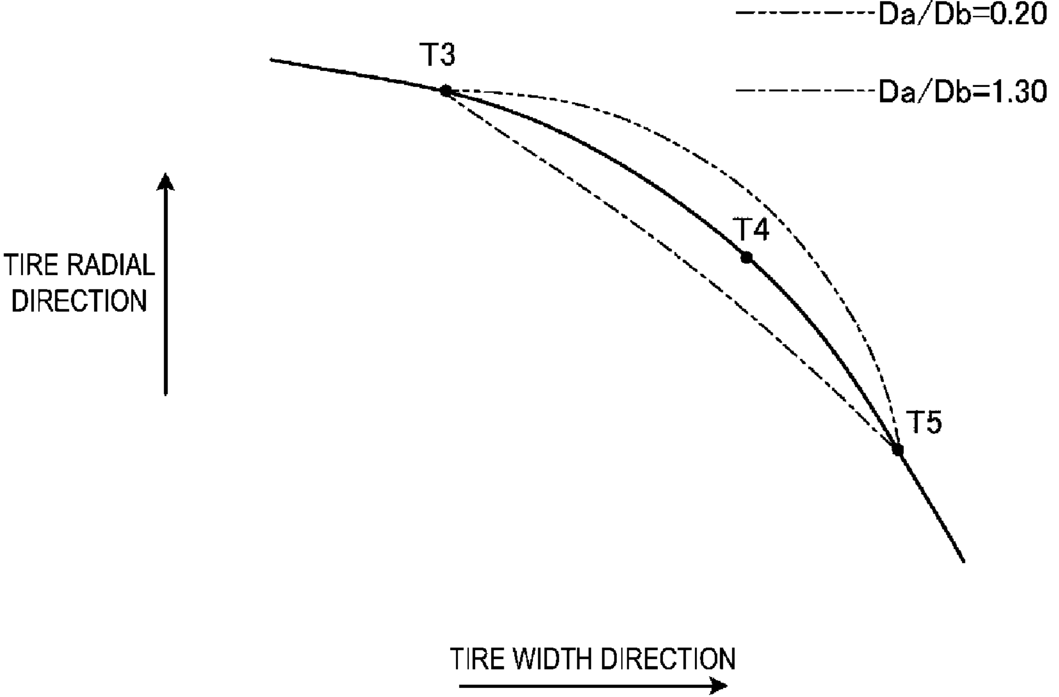
FIG. 3 is an enlarged view illustrating a main portion of the profile of the tire illustrated in FIG. 2.

FIG. 3 is an enlarged view illustrating a main portion of the profile of the tire illustrated in FIG. 2.

In FIG. 2, a radial distance Da from the point T3 to the point T4 with respect to a radial distance Db from the point T4 to the point T5 is in the range $0.20 \leq Da/Db \leq 1.30$ and preferably in the range $0.40 \leq Da/Db \leq 1.10$. Accordingly, the contact patch shape of the tire is appropriately ensured. Specifically, as illustrated in FIG. 3, as the ratio Da/Db is smaller, the radius of curvature R1 (see FIG. 2) of the first arc formed by the points T3, T4, and T5 becomes smaller, and the ground contact pressure of the tread portion shoulder increases. The lower limit described above of the ratio Da/Db suppresses a situation in which the ground contact pressure of the tread portion shoulder region excessively increases, ensuring the uniformity of the ground contact pressure distribution on the tire ground contact surface. As a result, the degradation of the tire rolling resistance is suppressed. On the other hand, as the ratio Da/Db is larger, the radius of curvature R1 of the first arc becomes larger, and the tire ground contact area decreases. The upper limit described above of the ratio Da/Db ensures the tire ground contact area, ensuring the wet performance of the tire. The radial distance Da is preferably in the ratio 2.0 mm≤Da≤7.0 mm.

Figure 4:
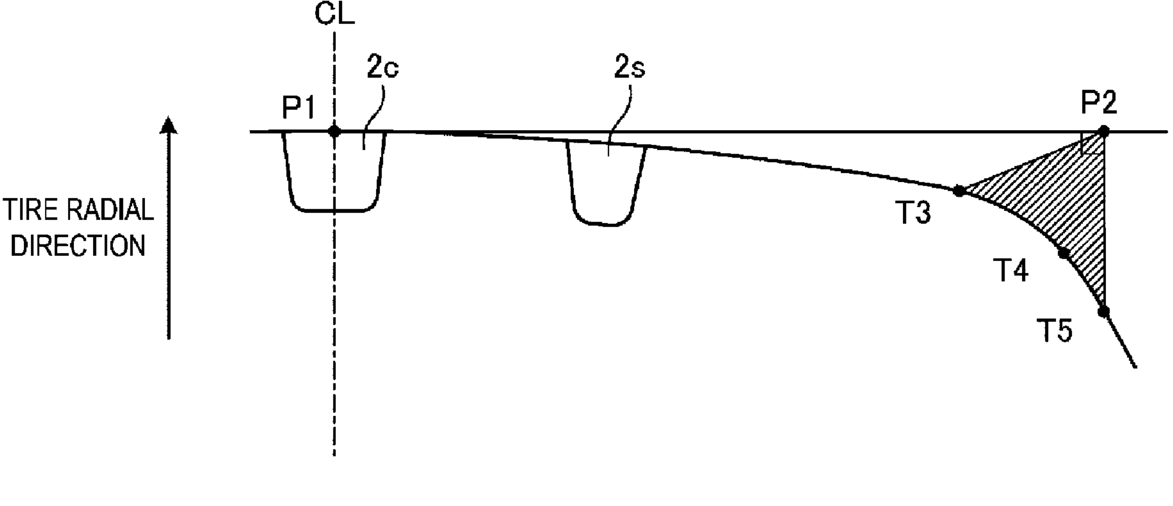
FIG. 4 is an explanatory diagram illustrating a tread portion of the tire illustrated in FIG. 1.
Figure 5:
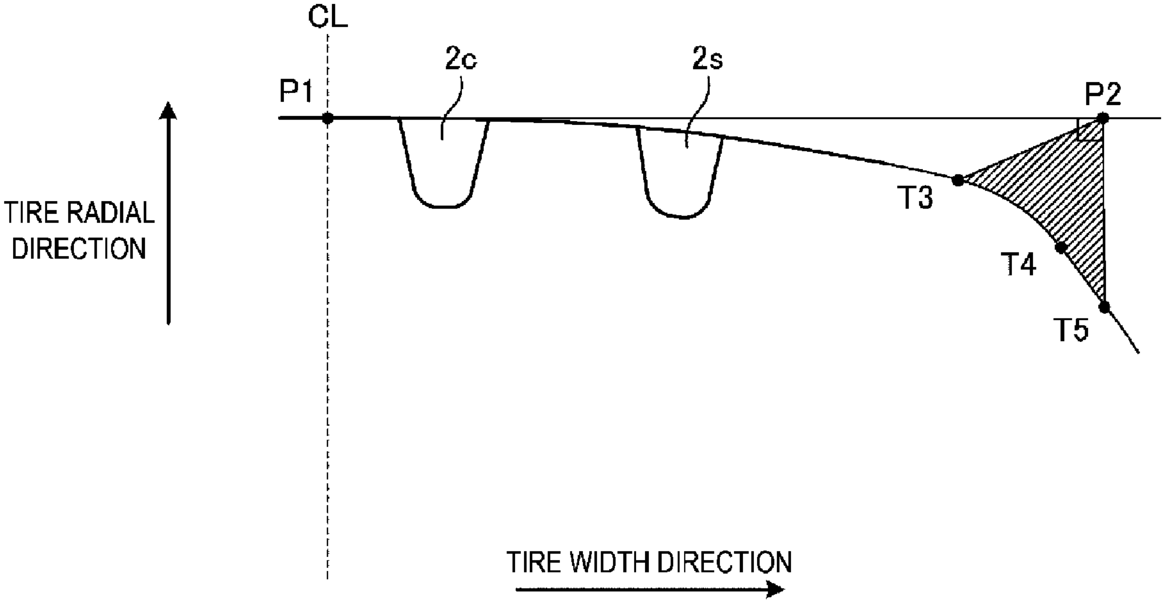
FIG. 5 is an explanatory diagram illustrating a modified example of the tire illustrated in FIG. 4.

FIG. 4 is an explanatory diagram illustrating the tread portion of the tire 1 illustrated in FIG. 1. FIG. 5 is an explanatory diagram illustrating a modified example of the tire 1 illustrated in FIG. 4.

In the configuration of FIG. 1, the tire 1 includes a plurality of circumferential main grooves 2*c*, 2*s* in the ground contact region of the tread surface. Here, the circumferential main groove 2*c* of the circumferential main grooves 2*c*, 2*s*, which is located closest to the tire equatorial plane CL is defined as a center main groove, and the circumferential main grooves located on the outermost side in the tire width direction are defined as shoulder main grooves.

In the configuration of FIG. 1, as illustrated in FIG. 4, the center main groove 2*c* is located on the tire equatorial plane CL. However, no such limitation is intended. As illustrated in FIG. 5, the center main groove 2*c* may be disposed at a distance from the tire equatorial plane CL.

In the configuration of FIG. 1, the tire 1 includes three circumferential main grooves formed of the single center main groove 2*c* and a pair of the shoulder main grooves 2*s*, 2*s*. However, no such limitation is intended, and the tire 1 may include four or more circumferential main grooves (not illustrated). For example, a pair of the center main grooves 2*c*, 2*c* may be disposed on the left and right sides of the tire equatorial plane CL, and a middle main groove may be disposed between the center main groove 2*c* and the shoulder main groove 2*s* (not illustrated).

Here, as illustrated in FIG. 4, an intersection point P2 between a straight line passing through the point P1 and parallel to the tire width direction and a straight line passing through the point T5 and parallel to the tire radial direction is defined.

In this case, a groove cross-sectional area Ac of the center main groove 2*c* in the cross-sectional view in the tire meridian direction with respect to an area At of a region surrounded by the points P2, T3, and T5 and the first arc passing through the points T3, T4, and T5 described above is in the range $0.30 \le Ac/At \le 1.00$ and preferably in the range $0.40 \le Ac/At \le 0.70$. Accordingly, the groove cross-sectional area Ac of the center main groove 2*c* is properly set. In other words, the groove cross-sectional area Ac of the center main groove 2*c* is smaller, the groove area of the tire ground contact region decreases, and the wet performance of the tire deteriorates. As the area At of the region described above is larger, the radius of curvature R1 (see FIG. 2) of the first arc formed by the points T3, T4, and T5 becomes larger, and the ground contact pressure distribution on the tire ground contact surface is non-uniform. Thus, the tire rolling resistance deteriorates. Consequently, the lower limit described above of the ratio Ac/At ensures the wet performance of the tire, and the tire rolling resistance is reduced. As the groove cross-sectional area Ac of the center main groove 2*c* is larger, the ground contact area of the tread portion center region decreases, and the tire rolling resistance deteriorates. As the area At of the region described above is smaller, the radius of curvature R1 of the first arc formed by the points T3, T4, and T5 becomes smaller, and the ground contact pressure of the tread portion shoulder region increases. Thus, the tire rolling resistance deteriorates. Consequently, the upper limit described above of the ratio Ac/At suppresses the deterioration of the tire rolling resistance.

The groove cross-sectional area Ac of the center main groove 2*c* in the cross-sectional view in the tire meridian direction with respect to a groove cross-sectional area As of the shoulder main groove 2*s* is in the range $1.05 \le Ac/As \le 1.80$ and preferably in the range $1.05 \le Ac/As \le 1.55$. Accordingly, the groove cross-sectional area ratio Ac/As of the center main groove 2*c* and the shoulder main groove 2*s* is properly set. In other words, since the center main groove 2*c* has a significant contribution to drainage properties, the larger the groove cross-sectional area Ac of the center main groove 2*c* is, the more the wet performance of the tire is improved. On the other hand, as the groove cross-sectional area Ac of the center main groove 2*c* is larger, the ground contact area of the tread portion center region decreases, and the tire rolling resistance deteriorates. As the groove cross-sectional area As of the shoulder main groove 2*s* is larger, the ground contact pressure distribution on the tire ground contact surface is non-uniform, and the tire rolling resistance deteriorates. The lower limit described above ensures the groove cross-sectional area Ac of the center main groove 2*c* having a significant contribution to drainage properties, ensuring the wet performance of the tire. The upper limit described above suppresses an excessive increase in the groove cross-sectional area As of the shoulder main groove 2*s*, and the deterioration of the tire rolling resistance is suppressed.

The groove cross-sectional areas Ac, As of the main grooves 2*c*, 2*s* are each measured as an area of a region surrounded by groove wall surfaces of the main groove and the tire profile in the cross-sectional view in the tire meridian direction when the tire is mounted on a specified rim, inflated to 230 kPa, and in an unloaded state. In a configuration where the main groove has chamfered portions on the groove opening portion (not illustrated), the areas of the chamfered portions are added to calculate the groove cross-sectional areas Ac, As. On the other hand, in a configuration where the main groove has decorative ridged/grooved portions on the groove walls (not illustrated), the groove cross-sectional areas Ac, As are calculated by using the groove wall surfaces from which the ridged/grooved portions are excluded. In a configuration where the groove area of the main groove changes in the tire circumferential direction (not illustrated), the maximum value of the groove cross-sectional area in the entire circumference of the tire is used as the groove cross-sectional areas Ac, As.

Figure 6:
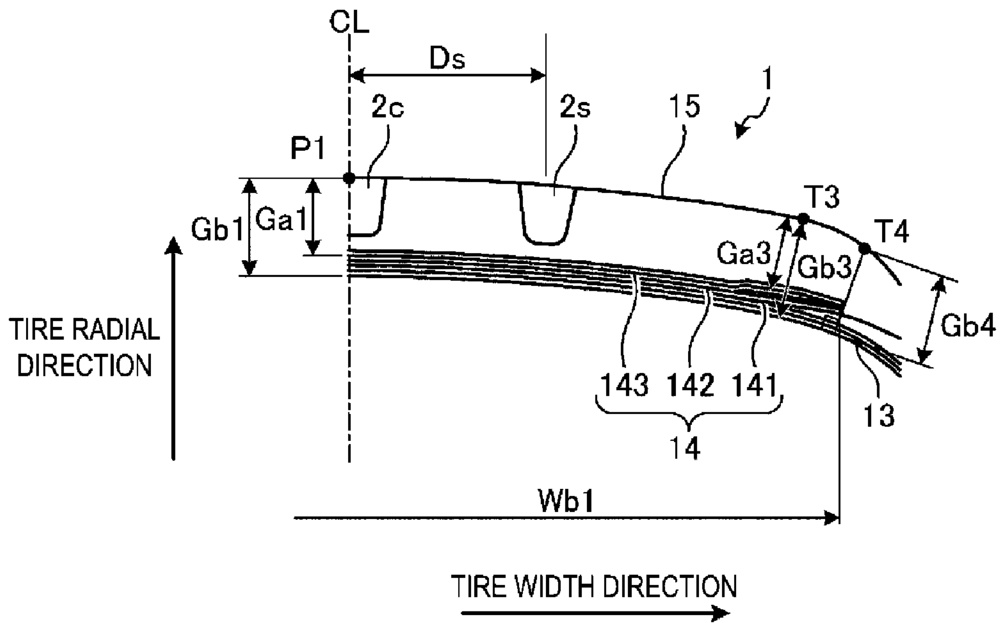
FIG. 6 is an enlarged view illustrating the tread portion of the tire illustrated in FIG. 1.

FIG. 6 is an enlarged view illustrating the tread portion of the tire 1 illustrated in FIG. 1. The same drawing illustrates the half region of the tread portion demarcated by the tire equatorial plane CL.

In FIG. 6, a distance Ds from the tire equatorial plane CL to the shoulder main groove 2*s* with respect to the tire cross-sectional width DW is in the range $0.03 \le Ds/DW \le 0.20$ and preferably in the range $0.10 \le Ds/DW \le 0.20$. Accordingly, the position of the shoulder main groove 2*s* is properly set. Specifically, the lower limit described above ensures rigidity of the tread portion center region, and the tire rolling resistance is reduced. The upper limit described above ensures drainage function by the shoulder main groove 2*s*, ensuring the wet performance of the tire.

The distance Ds to the shoulder main groove 2*s* is measured with a groove center line of the shoulder main groove 2*s* as an end point when the tire is mounted on a specified rim, inflated to 230 kPa, and in an unloaded state. The groove center line of the shoulder main groove 2*s* is defined as an imaginary line connecting midpoints of end points of the groove width. In a configuration where the groove center line has a zigzag shape or a wave-like shape, an imaginary line of the groove center line is defined as a straight line passing through a center line of an amplitude and parallel to the tire equatorial plane.

The tire cross-sectional width DW with respect to the tire outer diameter OD (not illustrated) is in the range $DW/OD \le 0.40$ and preferably in the range $DW/OD \le 0.35$.

In FIG. 1, a width Wb1 of the wider cross belt (the radially inner cross belt 141 in FIG. 1) of the pair of cross belts 141, 142 with respect to the tire cross-sectional width DW is in the range $0.60 \le Wb1/DW \le 0.90$ and preferably in the range $0.70 \le Wb1/DW \le 0.85$. Accordingly, the belt width Wb1 is properly set.

The width Wb1 of the belt ply is the distance in the tire width direction between left and right end points of the belt ply (more specifically, the belt cords on the outermost side in the tire width direction), and is measured when the tire is mounted on a specified rim, and inflated to 230 kPa, and in an unloaded state.

For example, in the configuration of FIG. 1, the radially inner cross belt 141 and the radially outer cross belt 142 of the belt layer 14 have a left-right symmetric structure with respect to the tire equatorial plane CL. The radially inner cross belt 141 is wider than the radially outer cross belt 142. As illustrated in FIG. 6, the edge portion of the radially inner cross belt 141 is located between the point T3 and the point T4 in the tire width direction.

In FIG. 6, a gauge Ga3 from the point T3 to the radially outer cross belt 142 with respect to a gauge Ga1 from the point P1 to the radially outer cross belt 142 is in the range $0.70 \le Ga3/Ga1 \le 0.98$ and preferably in the range $0.80 \le Ga3/Ga1 \le 0.98$. Accordingly, the tread gauge of the tread portion shoulder region is properly set, and the tire rolling resistance is reduced.

The gauges Ga1, Ga3 to the radially outer cross belt 142 are measured as lengths of perpendicular lines drawn respectively from the points P1, T3 on the tire profile to an outer surface of the radially outer cross belt 142. The outer surface of the radially outer cross belt 142 is defined as an imaginary line (not illustrated) connecting the outer ends of the belt cords constituting the radially outer cross belt 142.

In FIG. 6, a gauge Gb3 from the point T3 to a tire inner surface with respect to a gauge Gb1 from the point P1 to the tire inner surface is in the range $0.80 \le Gb3/Gb1 \le 1.10$ and preferably in the range $0.90 \le Gb3/Gb1 \le 1.10$. Accordingly, the total gauge of the tread portion shoulder region is properly set, and the tire rolling resistance is reduced.

In FIG. 6, a gauge Gb4 from the point T4 to the tire inner surface with respect to the gauge Gb3 from the point T3 to the tire inner surface is in the range $0.70 \le Gb4/Gb3 \le 1.10$ and preferably in the range $0.75 \le Gb4/Gb3 \le 1.05$. Accordingly, the contact patch shape of the tread portion shoulder region is properly set, and the tire rolling resistance is reduced.

The gauges Gb1, Gb3, and Gb4 to the tire inner surface are measured as respective lengths of perpendicular lines drawn from the points P1, T3 and T4 on the tire profile to the tire inner surface.

Effect

As described above, [1] the tire 1 includes the carcass layer 13, the belt layer 14 formed by layering the pair of cross belts 141, 142, the tread rubber 15, and the sidewall rubbers 16 (see FIG. 1). In the cross-sectional view in the tire meridian direction when the tire is mounted on a specified rim, inflated to 230 kPa, and in an unloaded state, the maximum diameter position of the tire profile is defined as the point P1, and the maximum width position of the tire profile is defined as the point T1. The intersection point between a straight line passing through the point T1 and parallel to the tire width direction and the tire equatorial plane CL is defined as the point T2. The position of 30% of the distance from the point T1 to the point T2 is defined as the point T3. The position of 20% of the distance from the point T1 to the point T2 is defined as the point T4. The position of 15% of the distance from the point T1 to the point T2 is defined as the point T5.

The position of 10% of the distance from the point T1 to the point T2 is defined as the point T6. The position of 3% of the distance from the point T1 to the point T2 is defined as the point T7 (see FIG. 2). In this case, the radial distance D3 from the point P1 to the point T3 with respect to the radial distance D1 from the point P1 to the point T1 is in the range $0.05 \le D3/D1 \le 0.15$. The radial distance D6 from the point P1 to the point T6 with respect to the radial distance D3 from the point P1 to the point T3 is in the range $3.00 \le D6/D3 \le 6.00$. The radius of curvature R1 of the first arc passing through the points T3, T4, and T5 with respect to the radius of curvature R2 of the second arc passing through the points T1, T6, and T7 is in the range $0.40 \le R1/R2 \le 1.00$.

In such a configuration, the ratio D3/D1, the ratio D6/D3, and the ratio R1/R2 under the use condition at high internal pressure are properly set, and thus there is an advantage that the tire's low rolling resistance performance and wet performance are provided in a compatible manner. Specifically, (1) the lower limit described above of the ratio D3/D1 suppresses a decrease in the tire rolling resistance due to an excessive ground contact pressure of the tread portion shoulder region. The upper limit described above of the ratio D3/D1 ensures a ground contact length of the tread portion shoulder region, ensuring the wet performance of the tire. (2) The lower limit described above of the ratio D6/D3 suppresses a decrease in tire ground contact area due to an excessive increase in the radial distance D3 from the point P1 to the point T3, ensuring the wet performance of the tire. The upper limit described above of the ratio D6/D3 suppresses a deterioration in the tire rolling resistance due to an excessive rubber volume of the buttress portion. (3) The lower limit described above of the ratio R1/R2 ensures uniformity of the ground contact pressure distribution on the tire ground contact surface, and energy loss during rolling of the tire is reduced. Accordingly, the tire rolling resistance is reduced. The upper limit described above of the ratio R1/R2 ensures the tensile force of the carcass layer 13, ensuring the rigidity of the tire. This appropriately ensures the contact patch shape of the tire, ensuring the wet performance of the tire.

[2] In the tire 1 according to the above [1], the radial distance D5 from the point P1 to the point T5 with respect to the radial distance D1 from the point P1 to the point T1 is in the range $0.20 \le D5/D1 \le 0.40$ (see FIG. 2). Accordingly, there is an advantage that the contact patch shape of the tire is appropriately ensured.

[3] In the tire 1 according to the above [1] or [2], the radial distance Da from the point T3 to the point T4 with respect to the radial distance Db from the point T4 to the point T5 is in the range $0.20 \le Da/Db \le 1.30$ (see FIG. 2). Accordingly, there is an advantage that the contact patch shape of the tire is appropriately ensured.

[4] In the tire 1 according to any one of the above [1] to [3], the radius of curvature R1 of the above first arc is in the range 20 mm≤R1≤50 mm (see FIG. 2). Accordingly, there is an advantage that the contact patch shape of the tire is appropriately ensured.

[5] The tire 1 according to any one of the above [1] to [4] further includes the plurality of circumferential main grooves 2*c*, 2*s* (see FIG. 1). The intersection point P2 between a straight line that passes through the point P1 and is parallel to the tire width direction and a straight line that passes through the point T5 and is parallel to the tire radial direction is defined, and the groove cross-sectional area Ac of the center main groove 2*c* in the cross-sectional view in the tire meridian direction with respect to the area At of the region surrounded by the intersection point P2, the points T3 and T5, and the above first arc is in the range $0.30 \le Ac/At \le 1.00$. Accordingly, there is an advantage that the groove cross-sectional area Ac of the center main groove 2*c* is properly set.

[6] In the tire 1 according to the above [5], the groove cross-sectional area Ac of the center main groove 2*c* in the cross-sectional view in the tire meridian direction with respect to the groove cross-sectional area As of the shoulder main groove 2_s_ is in the range 1.05≤Ac/As≤1.80 (see FIG. 4). Accordingly, there is an advantage that the groove cross-sectional area ratio Ac/As of the center main groove 2_c_ and the shoulder main groove 2_s_ is properly set.

[7] In the tire 1 according to any one of the above [1] to [6], the distance Ds from the tire equatorial plane CL to the shoulder main groove 2_s_ (FIG. 6) with respect to the tire cross-sectional width DW (FIG. 1) is in the range 0.03≤Ds/DW≤0.20. Accordingly, there is an advantage that the position of the shoulder main groove 2_s_ is properly set. The lower limit described above ensures rigidity of the tread portion center region, and the tire rolling resistance is reduced. The upper limit described above ensures drainage function by the shoulder main groove 2_s_, ensuring the wet performance of the tire.

[8] In the tire 1 according to any one of the above [1] to [7], the tire cross-sectional width DW (see FIG. 1) with respect to the tire outer diameter OD is in the range DW/OD≤0.40. Accordingly, there is an advantage that the tire cross-sectional width DW is properly set.

[9] In the tire 1 according to any one of the above [1] to [8], the belt width Wb1 of the wider cross belt (the radially inner cross belt 141 in FIG. 1) of the pair of cross belts 141, 142 with respect to the tire cross-sectional width DW is in the range 0.60≤Wb1/DW≤0.90. Accordingly, there is an advantage that the belt width Wb1 is properly set.

[10] In tire 1 according to any one of the above [1] to [9], the gauge Ga3 from the point T3 to the radially outer cross belt 142 of the plurality of cross belts 141, 142 with respect to the gauge Ga1 from the point P1 to the radially outer cross belt 142 is in the range 0.70≤Ga3/Ga1≤0.98 (see FIG. 6). Accordingly, there is an advantage that the tread gauge of the tread portion shoulder region is properly set.

[11] In the tire 1 according to any one of the above [1] to [10], the gauge Gb3 from the point T3 to the tire inner surface with respect to the gauge Gb1 from the point P1 to the tire inner surface is in the range 0.80≤Gb3/Gb1≤1.10 (see FIG. 6). Accordingly, there is an advantage that the total gauge of the tread portion shoulder region is properly set.

[12] In the tire 1 according to any one of the above [1] to [11], the gauge Gb4 from the point T4 to the tire inner surface with respect to the gauge Gb3 from the point T3 to the tire inner surface is in the range 0.70≤Gb4/Gb3≤1.10 (see FIG. 6). Accordingly, there is an advantage that the contact patch shape of the tread portion shoulder region is properly set.

EXAMPLES

FIGS. 7 to 9 are tables showing the results of performance tests of tires according to an embodiment of the technology.

In the performance tests, (1) low rolling resistance performance and (2) wet performance were evaluated for a plurality of types of test tires.

(1) In the evaluation of low rolling resistance performance, test tires having a tire size of 195/65R15 are assembled on rims having a rim size of 15×6, and an internal pressure of 230 kPa and a load of 4.82 kN are applied to the test tires. A drum testing machine having a drum diameter of 1707 mm is used, a multiplicative inverse of a rolling resistance coefficient of the test tire is calculated at speed of 80 km/h in accordance with ISO (International Organization for Standardization) 28580, and the evaluation is performed. The evaluation is expressed as index values and evaluated, with Comparative Example being assigned as the reference (100). In the evaluation, larger values are preferable.

(2) In the evaluation of wet performance, test tires having a tire size of 195/65R15 are assembled on rims having a rim size of 15×6, and an internal pressure of 230 kPa and a load of 4.1 kN are applied to the test tires. The test vehicle runs on an asphalt road on which water is sprinkled to a water depth of 1 mm, and a braking distance from an initial speed of 40 km/h is measured. Then, the evaluation is expressed as index values and evaluated, with Comparative Example being assigned as the reference (100). In the evaluation, larger values are preferable.

The test tires of Example and Comparative Example have the configurations of FIGS. 1 and 2. The tire outer diameter OD (not illustrated) is 640 mm, and the tire cross-sectional width DW (see FIG. 1) is 211 mm. The radial distance D1 from the point P1 to the point T1 is 63 mm.

As can be seen from the test results, the test tires of Example can provide the low rolling resistance performance and wet performance in a compatible manner under the use condition at high internal pressure.

The invention claimed is:

1. A tire, comprising:

a carcass layer;

a belt layer formed by layering a pair of cross belts; and a tread rubber and sidewall rubbers;

in a cross-sectional view in a tire meridian direction when the tire is mounted on a specified rim, inflated to 230 kPa, and in an unloaded state, a maximum diameter position of a tire profile being defined as a point P1, a maximum width position of the tire profile being defined as a point T1, an intersection point between a straight line that passes through the point T1 and is parallel to a tire width direction and a tire equatorial plane being defined as a point T2, a position of 30% of a distance from the point T1 to the point T2 being defined as a point T3, a position of 20% of the distance from the point T1 to the point T2 being defined as a point T4, a position of 15% of the distance from the point T1 to the point T2 being defined as a point T5, a position of 10% of the distance from the point T1 to the point T2 being defined as a point T6, a position of 3% of the distance from the point T1 to the point T2 being defined as a point T7, a radial distance D3 from the point P1 to the point T3 with respect to a radial distance D1 from the point P1 to the point T1 being in a range 0.05≤D3/D1≤0.15, a radial distance D6 from the point P1 to the point T6 with respect to the radial distance D3 from the point P1 to the point T3 being in a range 3.00≤D6/D3≤6.00, and a radius of curvature R1 of a first arc passing through the points T3, T4, and T5 with respect to a radius of curvature R2 of a second arc passing through the points T1, T6, and T7 being in a range 0.40≤R1/R2≤1.00.

2. The tire according to claim 1, wherein a radial distance D5 from the point P1 to the point T5 with respect to the radial distance D1 from the point P1 to the point T1 is in a range 0.20≤D5/D1≤0.40.

3. The tire according to claim 1, wherein a radial distance Da from the point T3 to the point T4 with respect to a radial distance Db from the point T4 to the point T5 is in a range 0.20≤Da/Db≤1.30.

4. The tire according to claim 1, wherein the radius of curvature R1 of the first arc is in a range 20 mm≤R1≤50 mm.

5. The tire according to claim 1, comprising a plurality of circumferential main grooves, wherein a circumferential main groove closest to the tire equatorial plane of the plurality of circumferential main grooves is defined as a center main groove, an intersection point P2 between a straight line that passes through the point P1 and is parallel to the tire width direction and a straight line that passes through the point T5 and is parallel to a tire radial direction is defined, and a groove cross-sectional area Ac of the center main groove in the cross-sectional view in the tire meridian direction with respect to an area At of a region surrounded by the intersection point P2, the points T3 and T5, and the first arc is in a range $0.30 \leq Ac/At \leq 1.00$.

6. The tire according to claim 1, comprising a plurality of circumferential main grooves, wherein a circumferential main groove on an outermost side in the tire width direction of the plurality of circumferential main grooves is defined as a shoulder main groove, and a groove cross-sectional area Ac of a center main groove in the cross-sectional view in the tire meridian direction with respect to a groove cross-sectional area As of the shoulder main groove is in a range $1.05 \leq Ac/As \leq 1.80$, a circumferential main groove closest to the tire equatorial plane of the plurality of circumferential main grooves being defined as the center main groove.

7. The tire according to claim 1, comprising a plurality of circumferential main grooves, wherein a circumferential main groove on an outermost side in the tire width direction of the plurality of circumferential main grooves is defined as a shoulder main groove, and a distance Ds from the tire equatorial plane to the shoulder main groove with respect to a tire cross-sectional width DW is in a range $0.03 \leq Ds/DW \leq 0.20$.

8. The tire according to claim 1, wherein a tire cross-sectional width DW with respect to a tire outer diameter OD is in a range $DW/OD \leq 0.40$.

9. The tire according to claim 1, wherein a belt width Wb1 of a wider cross belt of the pair of cross belts with respect to a tire cross-sectional width DW is in a range $0.60 \leq Wb1/DW \leq 0.90$.

10. The tire according to claim 1, wherein a gauge Ga3 from the point T3 to a radially outer cross belt of the pair of cross belts with respect to a gauge Ga1 from the point P1 to the radially outer cross belt is in a range $0.70 \leq Ga3/Ga1 \leq 0.98$.

11. The tire according to claim 1, wherein a gauge Gb3 from the point T3 to a tire inner surface with respect to a gauge Gb1 from the point P1 to the tire inner surface is in a range $0.80 \leq Gb3/Gb1 \leq 1.10$.

12. The tire according to claim 1, wherein a gauge Gb4 from the point T4 to a tire inner surface with respect to a gauge Gb3 from the point T3 to the tire inner surface is in a range $0.70 \leq Gb4/Gb3 \leq 1.10$.

* * * * *